United States Patent Office
3,141,833
Patented July 21, 1964
:::

3,141,833
MALTING OF BARLEY AND OTHER CEREALS

Thomas Robert Dixon, deceased, late of Thriplow Place, near Royston, England, by Lloyds Bank Limited, executor, London, England, assignor to The Dixon Malt Company Limited and The Enzymic Malt Company Limited, both of London, England No Drawing. Filed Aug. 20, 1962, Ser. No. 218,170
5 Claims. (Cl. 195—70)

This invention relates to improvements in the malting of barley and other cereals.

Shortly described, malt is made by first steeping barley or other cereals in water contained in a steeping tank. The grain is normally steeped for 50 to 72 hours as may be required, the object being to soften the outer and inner skins of the barley corn as well as the starchy body, so that the enzymes present in the endosperm may be better able to exercise their functions. After the barley has been sufficiently softened the water is drained out of the tank and the steeped material is dropped from the tank to the malting floor, where in due course it forms "buds" and subsequently rootlets. It lies on the floors at varying thickness and becomes known as the couch, the object being to keep the mass at an approximate temperature of 16° C., which is obtained and controlled spontaneously depending upon the thickness and moisture of the grain. Should the temperature rise beyond 16° C. the couch is broken down by shovels, thus reducing the temperature to that which is desired. It can also be reduced artificially by passing a current of air through the grain of a suitable temperature for cooling, but it is very unlikely that such a device would have to be used. Usually the various temperatures that come into play during the couching period are readily obtained by thickening or thinning the grain dependent upon the heat required. The moisture in the grain and the chemical action taking place inside the grain take their part in the formation of heat.

If the heat becomes too high, the rootlets grow very fast, thus robbing the malt of extract so badly needed by the brewer. If on the other hand the grain becomes too cold, growth is retarded and the enzymes cannot "modify" the grain. This also means a loss of extract for the brewer.

The object of the present invention is to control the enzymatic action of the grain. The maltster has to render the barley corn amenable to the enzymes within it which lie ready to work. A further object is therefore to control the whole process in the most satisfactory manner from start to finish, yielding malts of suitable quality, and more economically than heretofore.

Attention must be drawn to the fact that a standard bushel of barley weighs 56 lbs. and a standard bushel of malt weighs 42 lbs., and as malt and barley are bought and sold by weight it is important that as much as possible of this difference of 14 lbs. should be saved for the maltster, that is, as much as is consistent with good quality.

This difference of 14 lbs. per bushel of barley equals 25% of the original weight of the barley from which the malt is made and can be accounted for in the following way:

Moisture

The malster cannot exercise control over the percentage of moisture contained in the barley, as this is dependent upon the weather encountered by the barley during its growing and harvesting period. For example, a wet season might produce barleys containing as much as 20% moisture, but if the weather has been very dry, barley may contain as little as 14% moisture. These figures are approximate, but an average moisture could be said to be 16%. Finished malt, at the conclusion of the malting process, may have a moisture content of approximately 2%. This means a net moisture loss of approximately 14%.

Steeping Losses

These may be regarded as about 2%.

Respiration

Weight is lost by respiration or breathing of the corn of carbon dioxide. This accounts for approximately 5%.

Rootlets

Respiration allows the growth of rootlets, known as malt culms, and this may account for approximately 4%.

A summary of the above losses shows the following:

|  | Percent |
|---|---|
| Moisture | 14 |
| Steeping losses | 2 |
| Respiration | 5 |
| Rootlets | 4 |
|  | 25 |

It is to the interdependent actions of respiration and rootlet growth that the maltster must direct his system of working to effect savings and these two factors must be brought under close control.

It is a further object of the invention to effect this control in the manner to be described, bearing in mind that the body and integumentae of the grain require heat and moisture for the encouragement of the chemical changes which must take place within them by the action of enzymes such as diastase, acting principally upon the starch contents of the grain, and cytase which deals principally with the cellulose tissues of the inner protective skins.

Steep Temperature

The steep temperature is a very important factor. Hitherto, the temperatures traditionally practised by maltsters have been about 12–13° C., and sometimes as high as 15–16° C. Steep temperatures as high as 20° C. have, so far as is known, never even been contemplated.

In contradistinction to this, the present invention contemplates the use of far higher steeping temperatures, that is, of approximately 27° C., or even higher temperatures.

According to the invention, a method of malting barley or other cereal comprises steeping the grain at approximately 27° C., or even higher temperatures, draining away the steep water, and inhibiting the respiration of the grain, and so reducing malting loss, by regulation of the atmosphere present in a container containing the grain, by introducing an inert, non-toxic gas, e.g., carbon dioxide, prior to kilning.

The invention includes steeping the cereal at a temperature of approximately 27° C. for about 24 hours. Higher temperatures may be employed if necessary and longer steeping times may be needed in some cases. The temperature and number of hours given for steeping are not arbitrary and will be dictated by the general formation of the grain, which may vary in size and in coarseness of texture. These considerations are always encountered in malting and will of necessity lead to some variations in the temperature and duration of steeping. The modification will also be influenced by the original state of the grain, some part of which will have more original enzymes than other parts. The growth of the grain is controlled by regulation of the amount of air and of carbon dioxide present. To get as good a modification of the grain as possible it is necessary to adopt a method of helping the spontaneous breaking up of the high molecular materials of the grain by using methods of control to this end, such as for instance by the use of self-generated temperatures. If the self-generated temperatures are insufficient, heat may be applied by other means. When sufficiently modified the green malt is then passed to a kiln where it is dried and cured. Any kiln similar to those in common use will suffice.

In one embodiment of the invention, which is purely by way of example, the steep water is heated to temperatures of approximately 27° C., and even to higher temperatures as may seem necessary for the best results. The grain is added to the water in the steeping tank after the desired heat has been obtained, and will remain there for about 24 hours. The steeping liquor is then run away. After drainage is complete no further operation will take place until it is seen that the grain is commencing to "bud" or grow. As soon as growth is observable the whole of the grain is transferred to another container provided with a cover. As soon as this exchange has taken place the opening in the cover through which the grain has been transferred is adequately sealed.

The grain is now stored in the container practically bereft of oxygen. The reason for this step is that under these conditions the growth of the grain will practically cease, but the growth of the bud will have been sufficient to break the testa. It may be necessary to stimulate the grain slightly during the operation and for this purpose minute quantities of air may be forced into the container at various temperatures as may be required by means of a suitable fan blowing the air through a conveniently arranged pipe. Inlets and outlets to deal with air additions or withdrawals are located as required on the container.

Also attached to the container is a smaller subsidiary pipe or maybe a number of these connected with the main air supply, at the end or ends of which are atomizing nozzles. These subsidiary pipes are connected to the main air pipe so that a mixture of air and liquor may be passed into the container as required.

Having now provided for the stimulation of the grain a proper system of checking this stimulation when desirable must be provided. This may be done in several ways. The first that occurs to mind is the exclusion of air, but this to be uniformly effective would be too drastic. During the process of the root formation there will be a certain amount of carbon dioxide formed and this of itself with the limited amount of air contained in the container is probably sufficient to cause the root to produce its own inhibition, and if this in practice proves to be so, there is no need to look for further check action on the growth of rootlets. It may even be that the auto-supply of carbon dioxide may have to be drawn off from the container from time to time and a further supply of fresh air is supplied to take its place, but in case these conditions do not apply a cylinder of carbon dioxide should be kept at hand from which to draw supplementary carbon dioxide in such quantities as may be deemed necessary. For the purpose of adding carbon dioxide, a suitable inlet is provided through a pipe with perforated arms able to reach the whole surface of the grain.

The advantages of this method of malting are very considerable. Under the methods of making malt heretofore a maltster making up malt from a barley containing approximately 16% moisture would probably obtain one quarter of malt (24 stone) from 1 quarter of barley (32 stone).

By the present invention 4–5% would be gained on malting, i.e., 100 quarters of barley containing on an average 16% of moisture, instead of yielding 100 quarters of malt, would yied 104–105 quarters. This comparison holds good when compared with any other system of malting. This again would mean a great relief to the barley supplies of the country.

The economic consideration is not the only one, because malts as made heretofore are very often insufficiently nitrogenous. By the saving of rootlets, which are highly nitrogenous, more of the nitrogen is preserved in the grain. It may be noted that malts insufficiently nitrogenous cause trouble when used in the brewery as they do not yield sufficient nitrogen as yeast food. Further, the proportions of carbohydrates, the principal chemical constituents of the grain, can be controlled within very narrow limits and in the most desirable proportions as may be essential in the composition of any particular class of beer or stout which may be aimed at in brewing.

There now remain two further operations before the treated grain may be regarded as malt. There is the operation of drying, which is conducted on kilns provided for the purpose. Any well constructed kiln, of which there are many types, will suffice for the drying of malt made according to the invention.

Distillers and bakers are mainly concerned with the production of dried malt where big percentages of diastase are required. The malt after going through the process described above is placed on a kiln and dried to a percentage of 5 or 6% of moisture content sufficient to put the malt into a dry enough state for grinding, but in the making of malts for ales and the like the drying process is extended to what is known as the curing process, which means that the malt is left longer on the kilns, anything from 24 to 72 hours, to produce an aromatic flavour. The heat may go as high as 105° C., or the malt may be finished off at lower temperatures. The temperatures for curing depend largely on the type of kiln used, but in the case of the malt produced according to the invention there is an advantage to be gained in the drying and also in the curing, because this malt carries practically no rootlets, and it is owing to the lavish supply of rootlets on ordinary malt that such difficulty is encountered in drying the moisture out of the green malt (that is, malt just before it is sent to kiln). The moisture is held by the rootlets, which tend to pack the grain into a fairly solid mass, preventing the percolation of the heat rising from the kiln furnace. With the malt according to the invention the course of the air is not impeded, so giving much quicker drying. Thus, about half the quantity of coal or other fuel generally used per quarter of malt will suffice.

What is claimed is:

1. A method of malting cereal, which comprises steeping the grain at not less than approximately 27° C., draining away the steep water, and inhibiting the respiration of the grain, and so reducing malting loss, by regulation of the atmosphere present in a container containing the grain, by introducing an inert, non-toxic gas from the group containing carbon dioxide and nitrogen prior to kilning.

2. A method of malting cereal as claimed in claim 1, which comprises steeping the cereal in a steep at a temperature of approximately 27° C. for about 24 hours.

3. A method of malting cereal as claimed in claim 1, wherein the changes in the grain are assisted by the supply of heat to the steeped grain from an external source.

4. A method of malting cereal as claimed in claim 1, wherein after the steeping the grain is transferred to an air-tight container.

5. A method of malting cereal as claimed in claim 1, wherein after steeping the grain is transferred to an air-tight container, which is provided with means to admit therein and extract therefrom controlled quantities of said inert, non-toxic gas.

References Cited in the file of this patent

UNITED STATES PATENTS

| | | |
|---|---|---|
| 500,305 | Tilden | June 27, 1893 |
| 2,191,838 | Freiherr von Horst | Feb. 27, 1940 |
| 3,014,847 | Kneen et al. | Dec. 26, 1961 |